(12) United States Patent
Vale et al.

(10) Patent No.: US 7,612,786 B2
(45) Date of Patent: Nov. 3, 2009

(54) VARIABLE ORIENTATION INPUT MODE

(75) Inventors: Peter O. Vale, Redmond, WA (US); Duncan, Camano Island, WA (US)

(73) Assignee: Microsoft Corporation, Redmond, WA (US)

( * ) Notice: Subject to any disclaimer, the term of this patent is extended or adjusted under 35 U.S.C. 154(b) by 406 days.

(21) Appl. No.: 11/350,853

(22) Filed: Feb. 10, 2006

(65) Prior Publication Data

US 2007/0188518 A1 Aug. 16, 2007

(51) Int. Cl.
*G06F 3/041* (2006.01)
*G09G 5/00* (2006.01)
*G06F 3/033* (2006.01)

(52) U.S. Cl. .................. 345/619; 345/173; 715/863
(58) Field of Classification Search ......... 345/173–178, 345/619; 715/863, 763
See application file for complete search history.

(56) References Cited

U.S. PATENT DOCUMENTS

| | | | |
|---|---|---|---|
| 5,230,063 A | 7/1993 | Hoeber et al. | |
| 5,423,554 A | 6/1995 | Davis | |
| 5,434,964 A | 7/1995 | Moss et al. | |
| 5,665,951 A | 9/1997 | Newman et al. | |
| 5,714,698 A | 2/1998 | Tokioka et al. | |
| 5,804,803 A | 9/1998 | Cragun et al. | |
| 5,910,653 A | 6/1999 | Campo | |
| 5,943,164 A | 8/1999 | Rao | |
| 6,159,100 A | 12/2000 | Smith | |
| 6,181,343 B1 | 1/2001 | Lyons | |
| 6,247,128 B1 | 6/2001 | Fisher et al. | |
| 6,333,735 B1 | 12/2001 | Anvekar | |
| 6,445,364 B2 | 9/2002 | Zwern | |

(Continued)

FOREIGN PATENT DOCUMENTS

WO 0050979 8/2000

(Continued)

OTHER PUBLICATIONS

Lee et al., "*Modeling Virtual Object Behavior within Virtual Environment*", Virtual Reality Laboratory, Dept. of Computer Science and Engineering, pp. 41-48.

(Continued)

*Primary Examiner*—Amr Awad
*Assistant Examiner*—Randal Willis
(74) *Attorney, Agent, or Firm*—Merchant & Gould; Ryan T. Grace

(57) ABSTRACT

User input methods may employ an input sensitive display screen that is agnostic with regard to the orientation in which the user is viewing the screen. Input methods may involve touching objects displayed on the screen, and movement of the objects may be determined by the release of a selected object, and a positional relationship involving the released and selected objects. A released object may automatically move towards, or away from, other selected objects. Alternatively, other selected objects may automatically move towards, or away from, the released object. Selection of objects may be performed in a sequence, and the particular sequence may help determine the direction of movement. Selection of multiple objects may be accomplished through a user simultaneously holding a finger over multiple objects, or a selection timer may be used to select multiple objects within a predetermined time. Gestures, such as a tilting of a finger on a display screen, may also determine movement characteristics.

20 Claims, 11 Drawing Sheets

U.S. PATENT DOCUMENTS

| | | |
|---|---|---|
| 6,448,964 B1 | 9/2002 | Isaacs et al. |
| 6,452,593 B1 | 9/2002 | Challener |
| 6,512,507 B1 | 1/2003 | Furihata |
| 6,545,663 B1 | 4/2003 | Arbter et al. |
| 6,568,596 B1 | 5/2003 | Shaw |
| 6,577,330 B1 | 6/2003 | Tsuda et al. |
| 6,593,945 B1 | 7/2003 | Nason et al. |
| 6,624,833 B1 | 9/2003 | Kumar |
| 6,630,943 B1 | 10/2003 | Nason et al. |
| 6,667,741 B1 | 12/2003 | Kataoka et al. |
| 6,667,986 B1 | 12/2003 | Sullivan et al. |
| 6,672,961 B1 | 1/2004 | Uzun |
| 6,735,625 B1 | 5/2004 | Ponna |
| 6,745,234 B1 | 6/2004 | Philyaw et al. |
| 6,767,287 B1 | 7/2004 | Mcquaid et al. |
| 6,768,419 B2 | 7/2004 | Garber et al. |
| 6,791,530 B2 | 9/2004 | Vernier et al. |
| 6,792,452 B1 | 9/2004 | Philyaw |
| 6,822,635 B2 | 11/2004 | Shahoian et al. |
| 6,847,856 B1 | 1/2005 | Bohannon |
| 6,910,076 B2 | 6/2005 | Lortz |
| 6,950,534 B2 | 9/2005 | Cohen et al. |
| 6,965,842 B2 | 11/2005 | Rekimoto |
| 6,990,660 B2 | 1/2006 | Moshir et al. |
| 7,036,090 B1 | 4/2006 | Nguyen |
| 7,085,590 B2 | 8/2006 | Kennedy et al. |
| 7,098,891 B1 | 8/2006 | Pryor |
| 7,104,891 B2 | 9/2006 | Osako et al. |
| 7,148,876 B2 | 12/2006 | Kawasome |
| 7,327,376 B2 | 2/2008 | Shen et al. |
| 7,469,381 B2 | 12/2008 | Ording |
| 7,843,015 | 1/2009 | Sato |
| 2001/0054082 A1 | 12/2001 | Rudolph et al. |
| 2002/0109737 A1* | 8/2002 | Jaeger .................. 345/863 |
| 2002/0151337 A1 | 10/2002 | Yamashita et al. |
| 2002/0154214 A1 | 10/2002 | Scallie et al. |
| 2003/0025676 A1 | 2/2003 | Cappendijk |
| 2003/0063132 A1 | 4/2003 | Sauer et al. |
| 2003/0119576 A1 | 6/2003 | McClintock et al. |
| 2003/0234773 A1 | 12/2003 | Sano et al. |
| 2004/0005920 A1 | 1/2004 | Soltys et al. |
| 2004/0032409 A1 | 2/2004 | Girard |
| 2004/0046784 A1 | 3/2004 | Shen |
| 2004/0051733 A1 | 3/2004 | Katzie |
| 2004/0090432 A1 | 5/2004 | Takahashi et al. |
| 2004/0127272 A1 | 7/2004 | Park et al. |
| 2004/0141008 A1 | 7/2004 | Jarczyk et al. |
| 2004/0212617 A1 | 10/2004 | Fitzmaurice |
| 2005/0054392 A1 | 3/2005 | Too |
| 2005/0069188 A1 | 3/2005 | Rubbert et al. |
| 2005/0110781 A1 | 5/2005 | Geaghan et al. |
| 2005/0122308 A1 | 6/2005 | Bell et al. |
| 2005/0134578 A1 | 6/2005 | Chambers et al. |
| 2005/0146508 A1 | 7/2005 | Kirkland et al. |
| 2005/0153128 A1 | 7/2005 | Selinfreund et al. |
| 2005/0162402 A1 | 7/2005 | Watanachote |
| 2005/0166264 A1 | 7/2005 | Yamada et al. |
| 2005/0177054 A1 | 8/2005 | Yi et al. |
| 2005/0183035 A1 | 8/2005 | Ringel |
| 2005/0193120 A1 | 9/2005 | Taylor |
| 2005/0200291 A1 | 9/2005 | Naugler et al. |
| 2005/0248729 A1 | 11/2005 | Drucker et al. |
| 2005/0251800 A1 | 11/2005 | Kurlander et al. |
| 2005/0253872 A1 | 11/2005 | Goss et al. |
| 2005/0277071 A1 | 12/2005 | Yee |
| 2005/0280631 A1 | 12/2005 | Wong et al. |
| 2006/0017709 A1 | 1/2006 | Okano |
| 2006/0026535 A1* | 2/2006 | Hotelling et al. ............ 715/863 |
| 2006/0075250 A1 | 4/2006 | Liao |
| 2006/0077211 A1 | 4/2006 | Zhou |
| 2006/0156249 A1 | 7/2006 | Blythe et al. |
| 2006/0161871 A1 | 7/2006 | Hotelling et al. |
| 2006/0244719 A1 | 11/2006 | Brigham et al. |
| 2006/0244734 A1 | 11/2006 | Hill et al. |
| 2007/0063981 A1 | 3/2007 | Galyean et al. |
| 2007/0220444 A1 | 9/2007 | Sunday et al. |
| 2007/0236485 A1 | 10/2007 | Trepte |
| 2007/0284429 A1 | 12/2007 | Beeman |
| 2007/0300182 A1 | 12/2007 | Bilow |
| 2007/0300307 A1 | 12/2007 | Duncan |
| 2008/0040692 A1 | 2/2008 | Sunday et al. |

FOREIGN PATENT DOCUMENTS

| | | |
|---|---|---|
| WO | WO0236225 | 5/2002 |
| WO | WO2005040944 | 5/2005 |
| WO | WO 2005122557 | 12/2005 |
| WO | 2006003586 | 1/2006 |

OTHER PUBLICATIONS

Nikitin et al., *Real-time simulation of elastic objects in Virtual Environments using finite element method and precomputed Green's functions*.

TouchTable™, Northrop Grumman, www.northropgrumman.com.

TouchTable™, Northrop Grumman, http://www.ms.northropgrumman.com/touchtable/index.html.

Noi Sukaviriya et al., "Augmenting a Retail Environment Using Steerable Interactive Displays", 2 pages, http://www.research.ibm.com/ed/publications/chi03b.pdf, date unknown.

Chia Shen et al., "DiamondSpin: An Extensible Toolkit for Around-the-Table Interaction", 8 pages, http://hci.stanford.edu/publications/2004/diamondspin/diamondspin.pdf, Apr. 2004.

Andrew D. Wilson, "PlayAnywhere: A Compact Interactive Tabletop Projection-Vision System", 10 pages, http://research.microsoft.com/~awilson/papers/Wilson%20PlayAnywhere%20UIST%202005.pdf, Oct. 2005.

U.S. Official Action mailed Jan. 12, 2009 cited in U.S. Appl. No. 11/378,267.

U.S. Official Action mailed Jan. 23, 2009 cited in U.S. Appl. No. 11/423,883.

U.S. Official Action mailed Dec. 2, 2008 in U.S. Appl. No. 11/278,264.

Sasaki et al., "Hands-Free User Interface for Seamless Collaborative Work in Shared MR Space", date unknown, 6 pp.

Krishna et al., "23.3: Tactile Sensor Based on Piezoelectric Resonance", 2002 IEEE, pp. 1643-1647.

http://www.softsland.com/Natural_Login_Pro.html, Apr. 13, 2006, 3 pp.

Logitech, "SecureConnect: A Major Leap in the Cordless Desktop Experience", http://www.logitech.com/pub/pdf/bluetooth/secure_connect_whitepaper.pdf, received Apr. 7, 2006, 5 pp.

Elzabadani et al., "Self-Sensing Spaces: Smart Plugs for Smart Environments", http://www.icta.ufl.edu/projects/publications/2005-ICOST-Selfsensingspaces.pdf, received Apr. 7, 2006, 8 pp.

Symantec, "Symantec Discovery: Track hardware/software assets and monitor license compliance throughout a multiplatform IT infrastructure", http://eval.veritas.com/mktginfo/enterprise/fact_sheets/ent-factsheet_discovery_12-2005.en-us.pdf, Dec. 2005, 5 pp.

Leikas et al., "Virtual Space Computer Games with a Floor Sensor Control Human Centered Approach in the Design Process", http://www.dcs.gla.ac/uk/~stephen/workshops/haptic/papers/leikas.pdf, date unknown, 4 pp.

Tollmar et al. "Gesture + Play, Exploring Full-Body Navigation for Virtual Environments", http://people.csail.mit.edu/demirdji/papers/cvprhci-pg.pdf, date unknown, 8 pp.

Stoakley et al., "Virtual Reality on a WIM: Interactive Worlds in Miniature", Conference on Human factors in Computer Systems, Proceedings of the SIGCHI Conference on Human Factors in Computing Systems, ACM Press/Addison-Wesley Publishing Co., http://delivery.acm.org/10.1145/230000/223938/p265-stoakley.html?key1=223938&key2=5808034411&coll=GUIDE&dl=GUIDE&CFID=73042672&CFTOKEN=344092262, 1995, 14 pp.

Turk, "Perceptual User Interfaces", http://ilab.cs.ucsb.edu/projects/turk/Turk&20DEC-NSF%20Workshop.pdt, date unknown, 10 pp.

U.S. Official Action mailed Mar. 3, 2008 in U.S. Appl. No. 11/278,264.

U.S. Official Action mailed May 30, 2008 in U.S. Appl. No. 11/425,843.

U.S. Official Action mailed Jul. 9, 2008 in U.S. Appl. No. 11/378,267.

U.S. Official Action mailed Jul. 10, 2008 in U.S. Appl. No. 11/423,883.

Lee et al., *"Modeling Virtual Object Behavior within Virtual Environment"*, Virtual Reality Laboratory, Dept. of Computer Science and Engineering, pp. 41-48, Nov. 11, 2002.

U.S. Official Action mailed Apr. 14, 2009, in U.S. Appl. No. 11/278,264 (14917.0961US01).

* cited by examiner

VARIABLE ORIENTATION INPUT MODE

BACKGROUND

In today's digital world, the use of graphical user interfaces (GUIs) to display and manage computer information has become ubiquitous. For example, the WINDOWS™ (Microsoft Corporation, Redmond, Wash.) operating systems used in many personal computers employs a GUI desktop with various icons or indicia representing objects on the computer system, and user input commands may be entered using keyboards, mice, etc. For these various types of input, there has traditionally been a direct correlation between directional orientation on the GUI and directional inputs on the input device. For example, pressing "up" on a keyboard key results in a corresponding upward movement of a cursor on the GUI.

This correlation helps provide an intuitive interface, but there is an inherent dependency required to provide the typical interface. Specifically, the designers of the system must assume that the input device, the GUI, and the display screen are all coordinated in terms of orientation. The GUI software counts on the "top" of the display screen as being the highest point of elevation from the user's point of view, while the keyboard designer assumes that the "up" arrow key should be mapped to movement towards the "top" of the GUI. In other words, the GUI software assumes the user will be viewing the screen from a certain orientation and certain point of view.

This assumption has suited traditional personal computing just fine, but the assumption begins to fail when a non-traditional display is used—such as a horizontally-oriented display surface (e.g., a table-top). Which way is "up" when the display is horizontal? What if 2, 3, or more people are standing around the display area at different locations? It would be an advance in the art if an alternative input mode could accommodate such differences in point of view.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of interacting with a computing device may include steps of displaying a plurality of graphical objects on a touch sensitive display, and detecting user selection of two or more of the objects through touching, or hovering, over the objects for a predetermined amount of time. The touch sensitive display may be sensitive to physical touch, and/or the proximity of a finger or stylus. The system may also receive a selection release input, such as the user lifting a finger, the re-selecting a previously selected object, the expiration of a selection timer, etc.

In response to releasing one of the selected objects, the system may move one or more of the selected objects. The direction and/or manner of this movement may be based on a positional relationship between the released and selected objects. For example, the released object may automatically move towards (or away from) one or more other selected objects. As another example, the other selected objects may automatically move towards (or away from) the released object.

The system may remember a sequence in which objects were selected, and the movement characteristics may be based on the sequence. For example, the system may use a selection timer, and may automatically release the first selected object when the timer expires.

Gestures may also affect the movement characteristic. For example, the system can assign different speeds or paths to different gestures, such as a twirl, curl of the finger, rotation, tilting, lifting speed, etc. A spiraling gesture may cause the object to move in a given direction, but in a spiraling path.

These methods may be implemented in computer-executable instructions, and may be used with a horizontally-placed display. For example, the display may be installed as a table-top, with users sitting around the periphery.

These and other features will be described in greater detail below.

DETAILED DESCRIPTION

Figure 1:
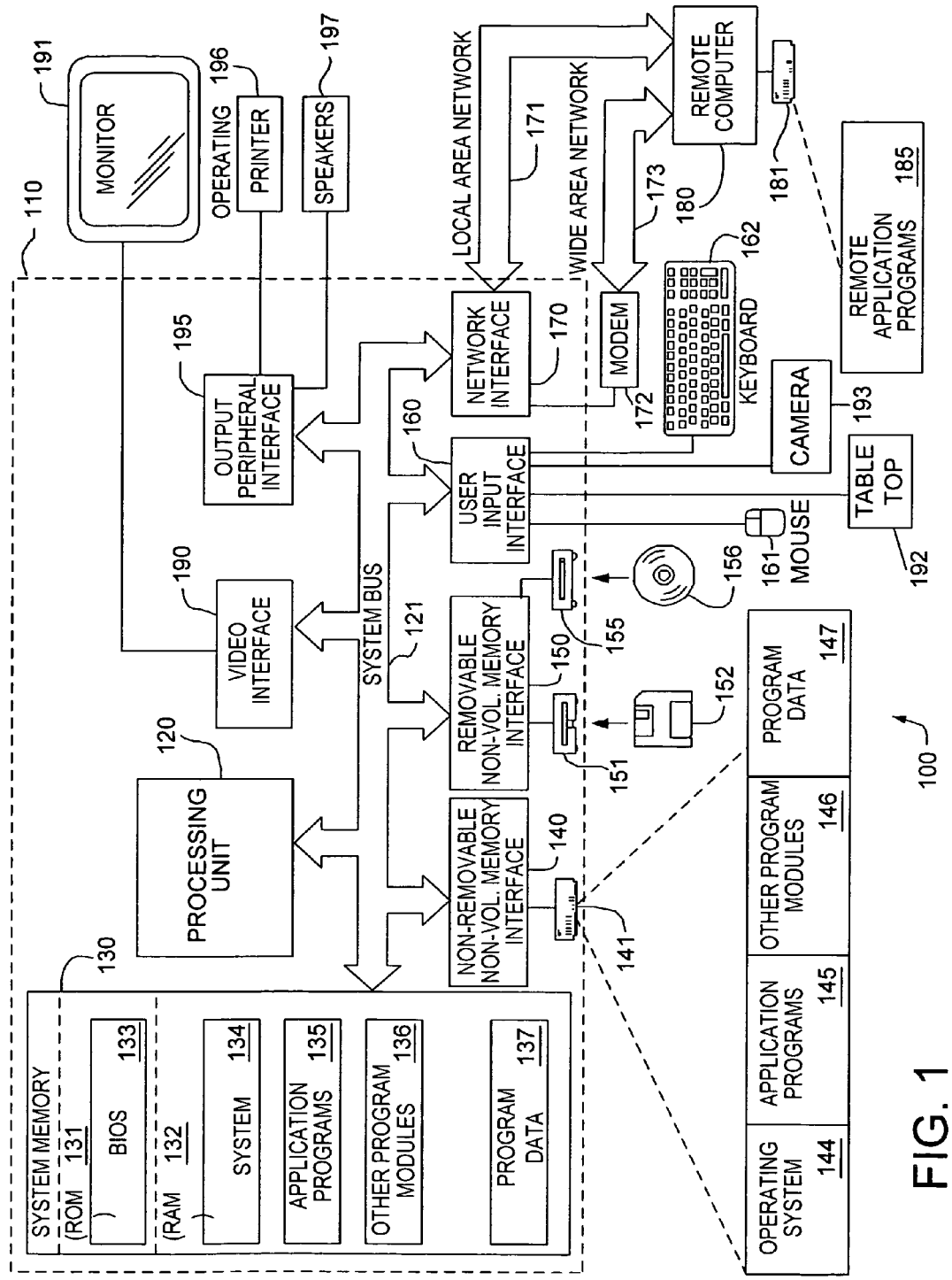
FIG. 1 illustrates an example of a computing system environment.

FIG. 1 illustrates an example of a suitable computing system environment 100 on which the features herein may be implemented. The computing system environment 100 is only one example of a suitable computing environment and is not intended to suggest any limitation as to the scope of use or functionality of the features described herein. Neither should the computing environment 100 be interpreted as having any dependency or requirement relating to any one or combination of components illustrated in the exemplary operating environment 100.

The features herein are described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the features may be practiced with other computer system configurations, including hand-held devices, multiprocessor systems, microprocessor-based or programmable consumer electronics, minicomputers, mainframe computers, and the like. The features may also be practiced in distributed computing environments where tasks are performed by remote processing devices that are linked through a communications network. In a distributed computing environment, program modules may be located in both local and remote computer storage media including memory storage devices.

With reference to FIG. 1, the exemplary system 100 for implementing features described herein includes a general purpose-computing device in the form of a computer 110 including a processing unit 120, a system memory 130, and a system bus 121 that couples various system components including the system memory to the processing unit 120.

Computer 110 may include a variety of computer readable media. By way of example, and not limitation, computer readable media may comprise computer storage media and communication media. The system memory 130 may include computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, may be stored in ROM 131. RAM 132 may contain data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 may be connected to the system bus 121 through a non-removable memory interface such as interface 140, and magnetic disk drive 151 and optical disk drive 155 may be connected to the system bus 121 by a removable memory interface, such as interface 150.

The drives and their associated computer storage media discussed above and illustrated in FIG. 1 may provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. The video interface 190 may be bidirectional, and may receive video input from sensors associated with the monitor 191. For example, the monitor 191 may be touch and/or proximity sensitive, such that contacts to a monitor surface may be used as input data. The input sensors for affecting this could be a capacitive touch sensitive device, an array of resistive contact sensors, an optical sensor or camera, or any other desired sensor to make the monitor 191 touch and/or proximity sensitive. In an alternative arrangement, or in addition, a touch and/or proximity sensitive input system may be separate from monitor 191, and may include a planar surface such as a table top 192 and any applicable sensing systems to make the planar surface touch sensitive, such as camera 193. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. Many of the features described herein may be implemented using computer-executable instructions stored on one or more computer-readable media, such as the media described above, for execution on the one or more units that make up processing unit 120.

Figure 2:
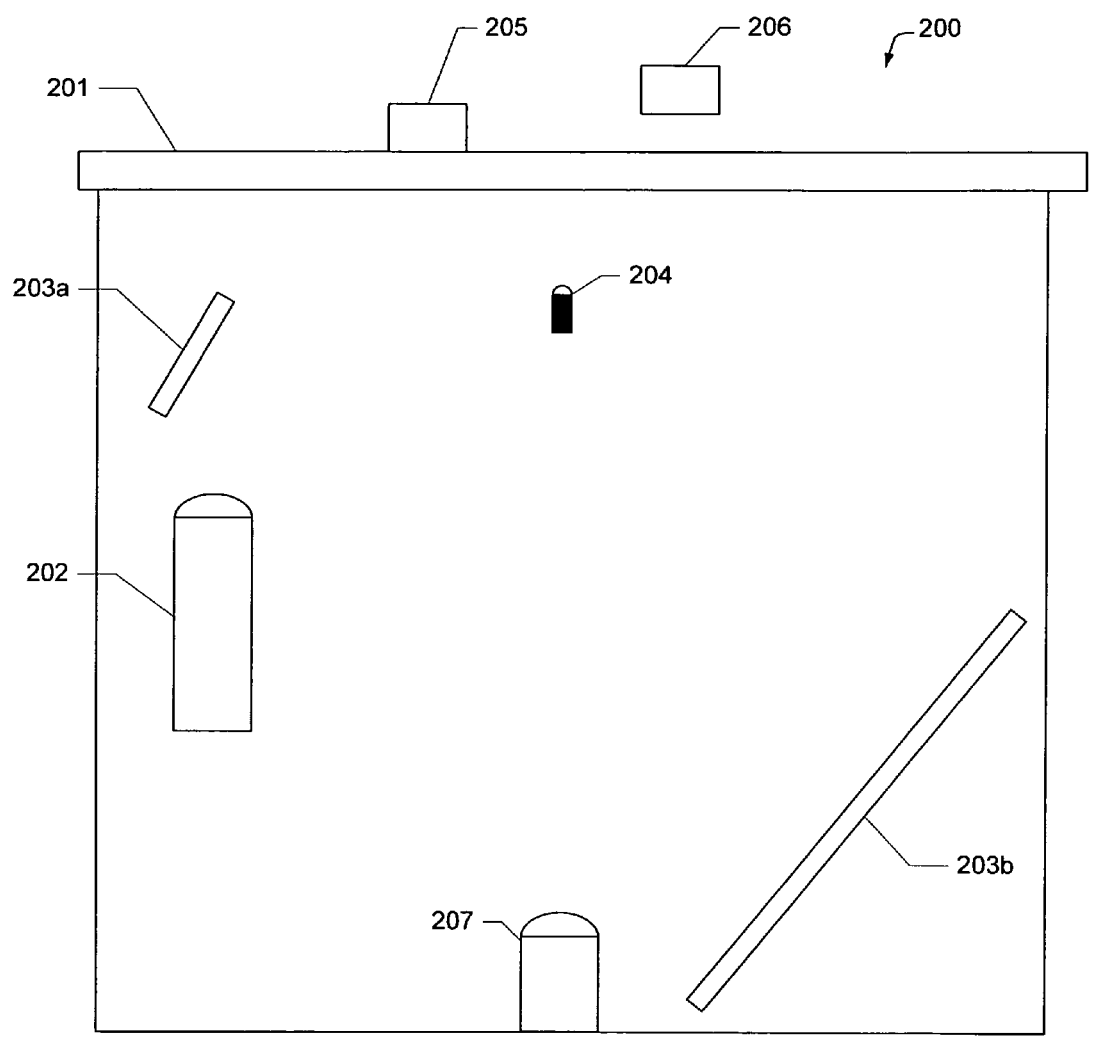
FIG. 2 illustrates an interactive table environment and interface.

The computing device shown in FIG. 1 may be incorporated into a system having table display device 200, as shown in FIG. 2. The display device 200 may include a display surface 201, which may be a planar surface such as a table top. As described hereinafter, the display surface 201 may also help to serve as a user interface.

The display device 200 may display a computer-generated image on its display surface 201, which allows the device 200 to be used as a display monitor for computing processes, displaying television or other visual images, video games, and the like. The display may be projection-based, and may use a digital light processing (DLP) technique, or it may be based on other display technologies, such as liquid crystal display (LCD) technology. A projector 202 may be used to project light onto the underside of the display surface 201. It may do so directly, or may do so using one or more mirrors. As shown in FIG. 2, the projector 202 projects light for a desired image onto a first reflective surface 203a, which may in turn reflect light onto a second reflective surface 203b, which may ultimately reflect that light onto the underside of the display surface 201, causing the surface 201 to emit light corresponding to the desired display.

In addition to being used as an output display for displaying images, the device 200 may also be used as an input-receiving device. As illustrated in FIG. 2, the device 200 may include one or more light emitting devices 204, such as IR light emitting diodes (LEDs), mounted in the device's interior. The light from devices 204 may be projected upwards through the display surface 201, and may reflect off of various objects that are above the display surface 201. For example, one or more objects 205 may be placed in physical contact with the display surface 201. One or more other objects 206 may be placed near the display surface 201, but not in physical contact (e.g., closely hovering). The light emitted from the emitting device(s) 204 may reflect off of these objects, and may be detected by a camera 207, which may be an IR camera if IR light is used. The signals from the camera 207 may then be forwarded to a computing device (e.g., the device shown in FIG. 1) for processing, which, based on various configurations for various applications, may identify the object and its orientation (e.g. touching or hovering, tilted, partially touching, etc.) based on its shape and the amount/type of light reflected. To assist in identifying the objects 205, 206, the objects may include a reflective pattern, such as a bar code, on their lower surface. To assist in differentiating objects in contact 205 from hovering objects 206, the display surface 201 may include a translucent layer that diffuses emitted light. Based on the amount of light reflected back to the camera 207 through this layer, the associated processing system may determine whether an object is touching the surface 201, and if the object is not touching, a distance between the object and the surface 201. Accordingly, various physical objects (e.g., fingers, elbows, hands, stylus pens, blocks, etc.) may be used as physical control members, providing input to the device 200 (or to an associated computing device).

The device 200 shown in FIG. 2 is illustrated as using light projection- and sensing techniques for the display of data and the reception of input, but other techniques may be used as well. For example, stylus-sensitive displays are currently available for use with Tablet-based laptop computers, and such displays may be used as device 200. Additionally, stylus- and touch-sensitive displays are available with many personal data assistants (PDAs), and those types of displays may also be used as device 200.

The device 200 is also shown in a substantially horizontal orientation, with the display surface 201 acting as a tabletop. Other orientations may also be used. For example, the device 200 may be oriented to project a display onto any desired surface, such as a vertical wall. Reflective IR light may also be received from any such oriented surface.

Figure 4:
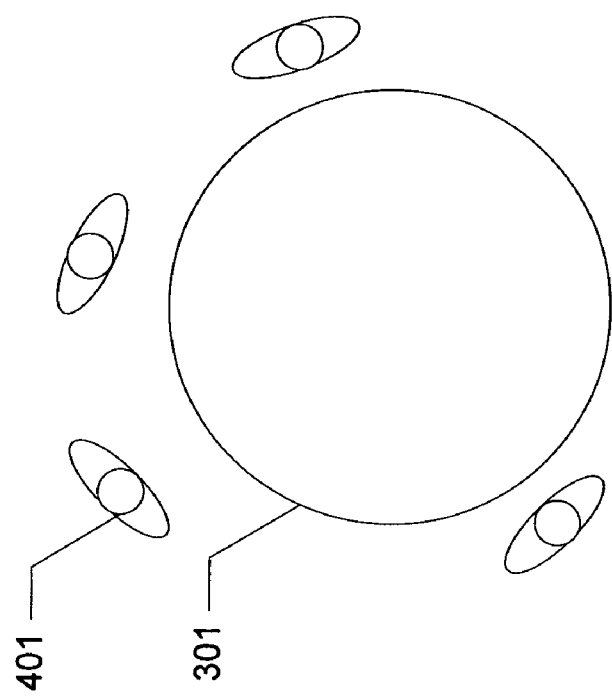
FIG. 4 illustrates a top view of the display from FIG. 3.
Figure 3:
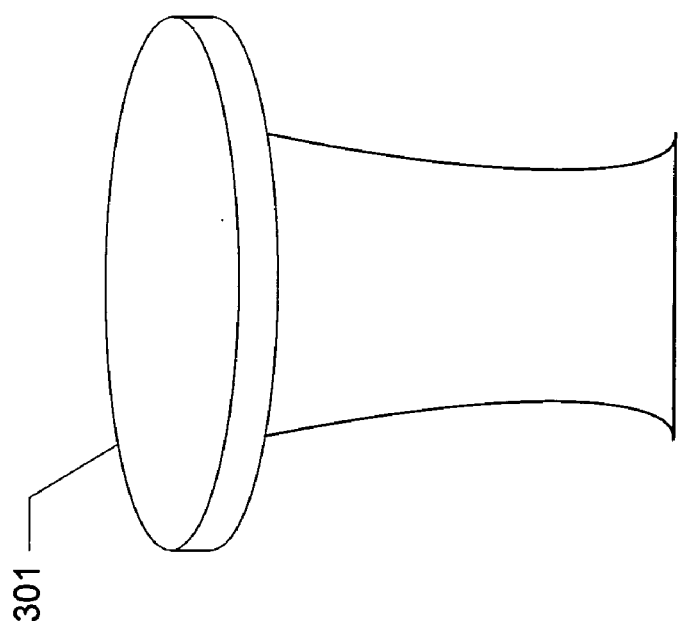
FIG. 3 illustrates an example of an interactive display.

FIG. 3 illustrates an illustrative configuration of an implementation of the system shown in FIG. 2, in which device 301 is used as a tabletop display device. FIG. 4 illustrates an overhead view of such a table, around which a number of users 401 may be seated or standing. Each user 401 may wish to interact with the display on the surface of table 301, for example to place and/or touch an object, or to play a party video game. If the various players 401 wish to participate in the same game, using the same display area of table 301, there might not be an "up" or "down" that is common among all players.

Figure 5:
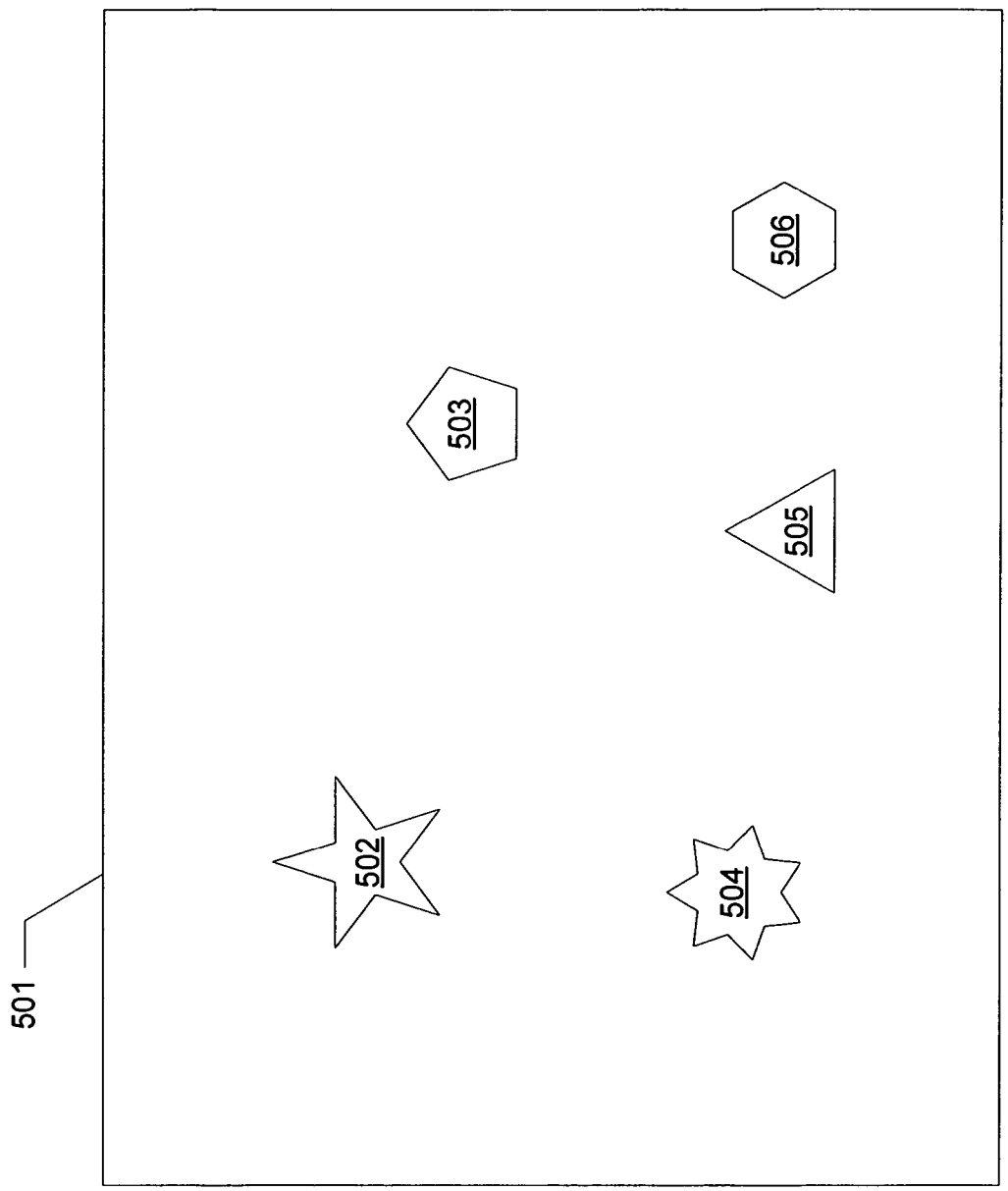
FIG. 5 illustrates an example display screen.

FIG. 5 illustrates an example of what may be displayed on the display surface 201, or on the upper surface of table 301. The display 501 is shown as a rectangle, but the display 501 may be of any desired shape, such as a circle, hexagon, triangle, etc. The display 501 may graphically depict a variety of virtual objects or icons 502-506 that may be manipulated through user input. The user input may be made using a physical control member to which the display is sensitive. For example, the display may detect the presence (e.g., hovering) and/or placement (e.g., touching) of a finger, stylus, or any other physical pointing device. The display 501 may be sensitive to a magnetic field stylus, or may be pressure sensitive to detect physical contact.

Figure 6:
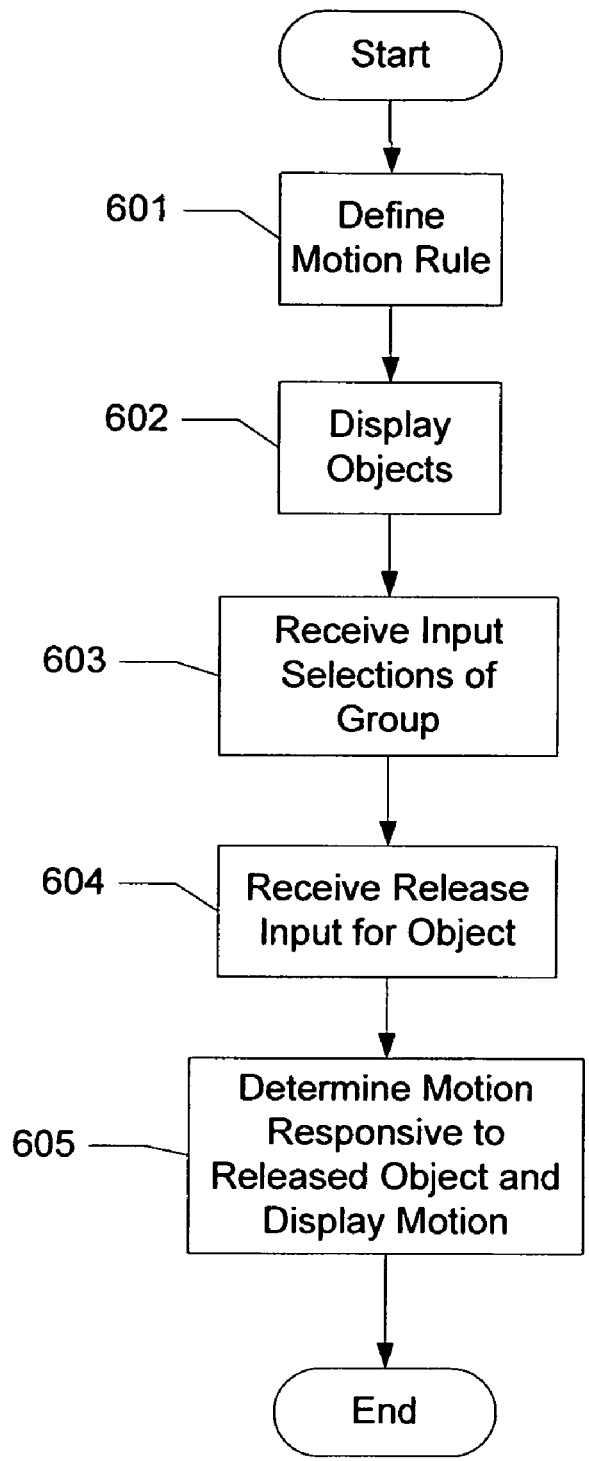
FIG. 6 illustrates an example method of managing user inputs.

FIG. 6 illustrates a process by which user inputs to display 501 may be handled. In general, the user's manipulation of the virtual objects 502-506 may involve selection of one or more of them, and a corresponding movement that may be based on the manner in which the user releases a selection of one or more of the selected virtual objects. In step 601, the process may first define the rule or rules that will govern the movement and user selection. These rules may be encoded as software algorithms and computer-executable instructions, and may be stored in the memory of the computing system operating the display 501. Examples of these rules will be addressed further below, but they generally may define movement characteristics (e.g., speed, direction, duration, etc.) and limitations (e.g., areas of the screen in which the objects can or cannot move, how movement is inhibited by other objects appearing on the screen, etc.). The rules may define which object(s) will move based on user input; the direction of movement; and other movement characteristics.

When the movement rules are established, the process may move to step 602, where the various virtual objects 502-506 may be displayed on the display 501. When the objects 502-506 are displayed, the system may then accept a variety of user inputs in step 603 to select one or more of the objects 502-506 for movement. These user inputs may involve, for example, a user placing a stylus (which may be any device through which the display 501 may receive inputs, such as a mechanical stylus, electromagnetic pen, human finger, etc.) over a displayed object and touching the object or holding the stylus on or over an object for at least a predetermined amount of time (e.g., 1 second, 2 seconds, etc.).

The user may select a group of multiple objects as well. There are a number of ways this group selection may be accomplished. For example, the selection of a second object while a first object is selected (e.g., placing a second finger over a second object while a first finger is over a first object) may cause the computer operating the display 501 to include the second object in a group with the first. Alternatively, the user may be given a predetermined amount of time to select objects (e.g., 10 seconds, 15 seconds, etc.), where selection of objects occurring within that period of time will automatically cause the selected objects to be selected as a group. As another alternative, the user may be given a predetermined amount of time (e.g., 1 second) after each selection to select another object, such that objects selected within that time are grouped with the previously-selected objects.

During this selection of objects, the computer operating the display 501 may store, in memory, information identifying the manner in which the various objects were selected. For example, the system may store an indication of the order in which they were selected, or the mechanism used for selection (e.g., selection by timing). This information may then be used to determine how objects should move and/or interact.

When the selection is complete (e.g., a timer expires, or the user provides an input indicating that selection is complete), the process may then receive, in step 604, another command indicating a release of one of the selected objects. This release may be accomplished in a variety of ways. For example, if the selection rule requires users to maintain continuous selection of the selected virtual objects, such as by holding a finger over each selected object, the user may release one of the virtual objects by ceasing its selection (e.g., by lifting a finger off of the selected virtual object), or by entering another input associated with the object (e.g., a swipe of the finger across a periphery of the virtual object, or sliding off an edge of the object), or any other input (e.g., with a footpedal, additional button, voice, etc.). As another example, the first (or last, or other predefined number) object selected may automatically be released when the selection is over (e.g., if a selection timer is used, the first object may be automatically released upon expiration of the timer).

With the release of an object (or multiple objects), the system may then, in step 605, consult the movement rule(s) and apply them to move the virtual objects on the screen accordingly to determine how the objects should be moved. This determination may include determining a direction of movement, a speed, a path (e.g., spiraling, winding, etc.), or any other characteristic, and the movement may be displayed as an animation on the display screen. Examples of this movement will now be addressed below, in connection with FIGS. 7a-12b.

Figure 7A:
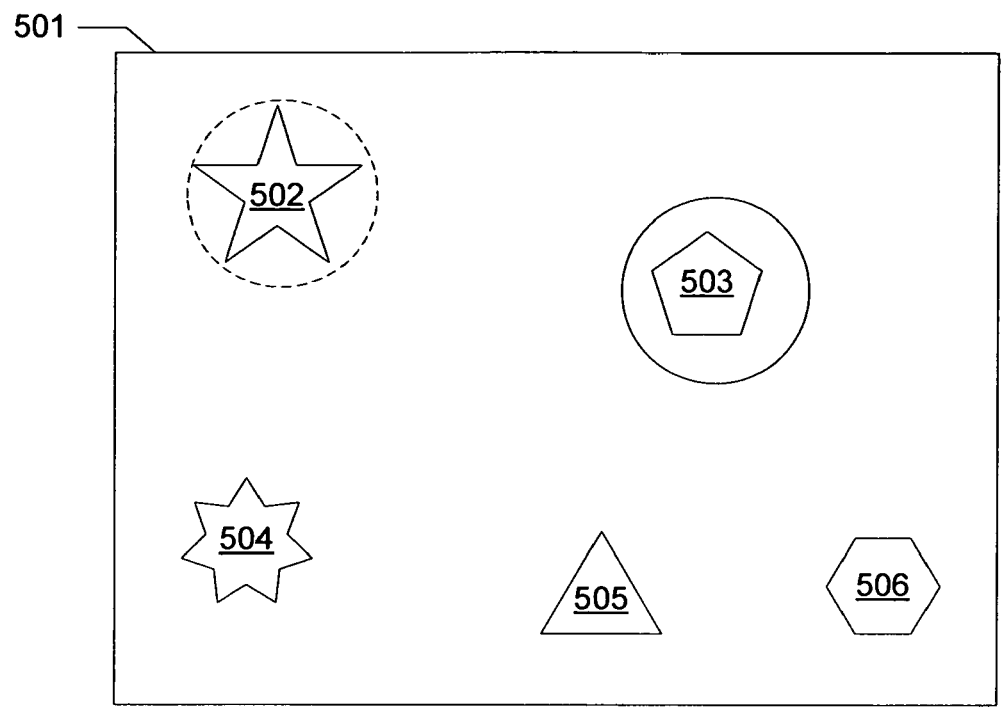
FIGS. 7a and 7b illustrate an example sequence of managed user inputs.
Figure 7B:
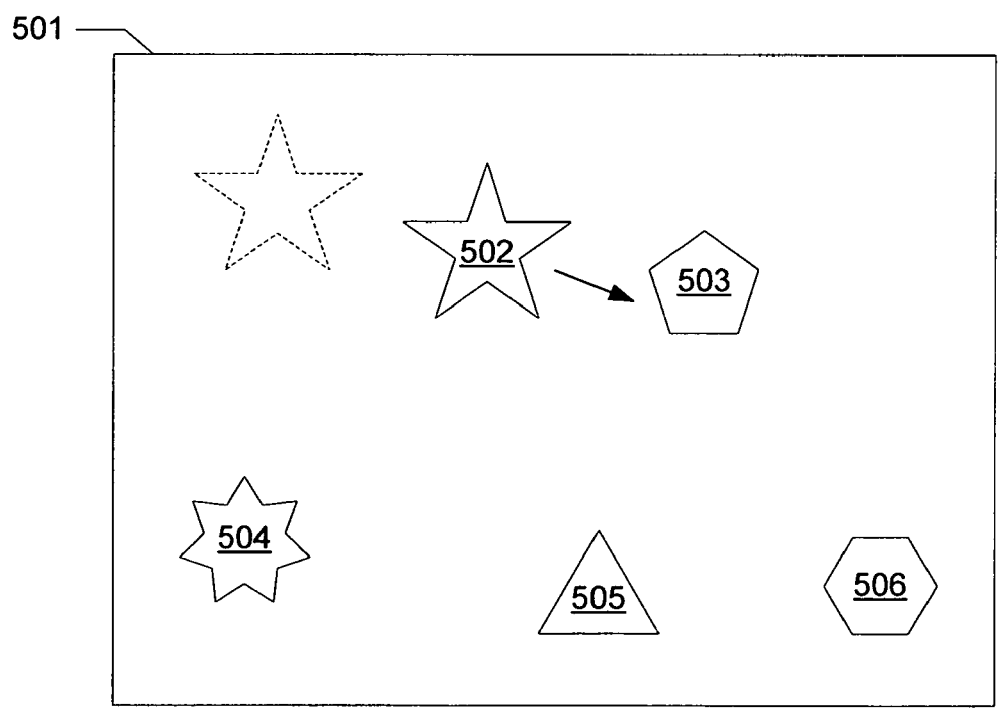

FIGS. 7a and 7b illustrate sequences of display that may occur when a movement rule defines movement based on order of release, where the released object is the moving object, and the direction of movement is towards the other selected object(s). In the example shown in FIG. 7a, a variety of virtual objects 502-506 are displayed, where two objects (502 and 503) are selected, as represented by the circles surrounding these objects. When one object is released (object 502), it may move linearly towards the other selected object (object 503), as shown in FIG. 7b. As an alternative rule, the direction of movement may be in the opposite direction. In other words, the released object may move in a direction that is away from the other selected object.

Figure 8A:
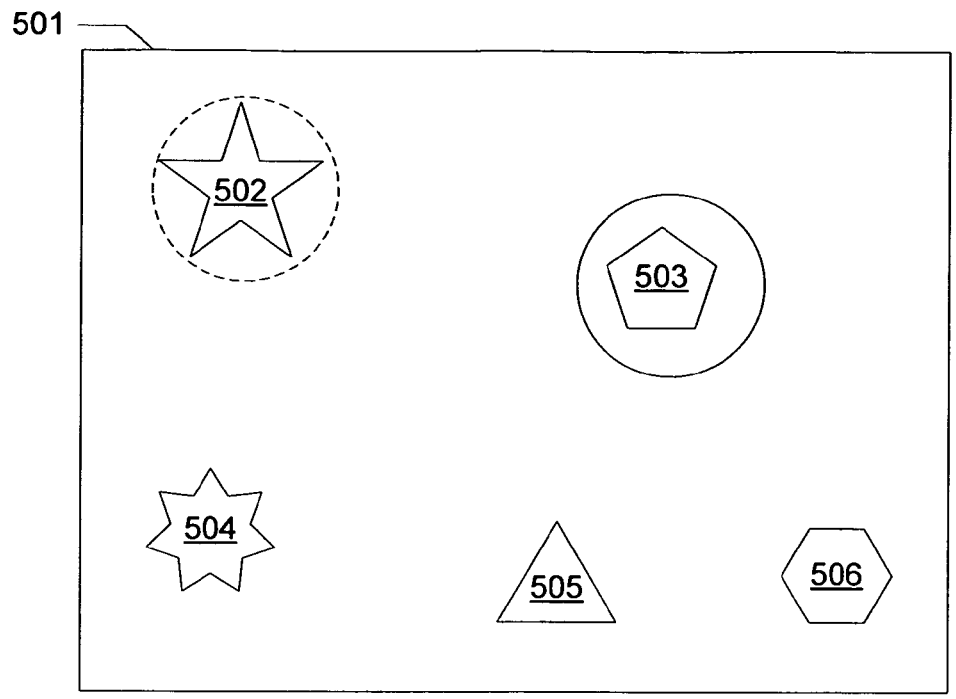
FIGS. 8a and 8b illustrate an example sequence of managed user inputs.
Figure 8B:
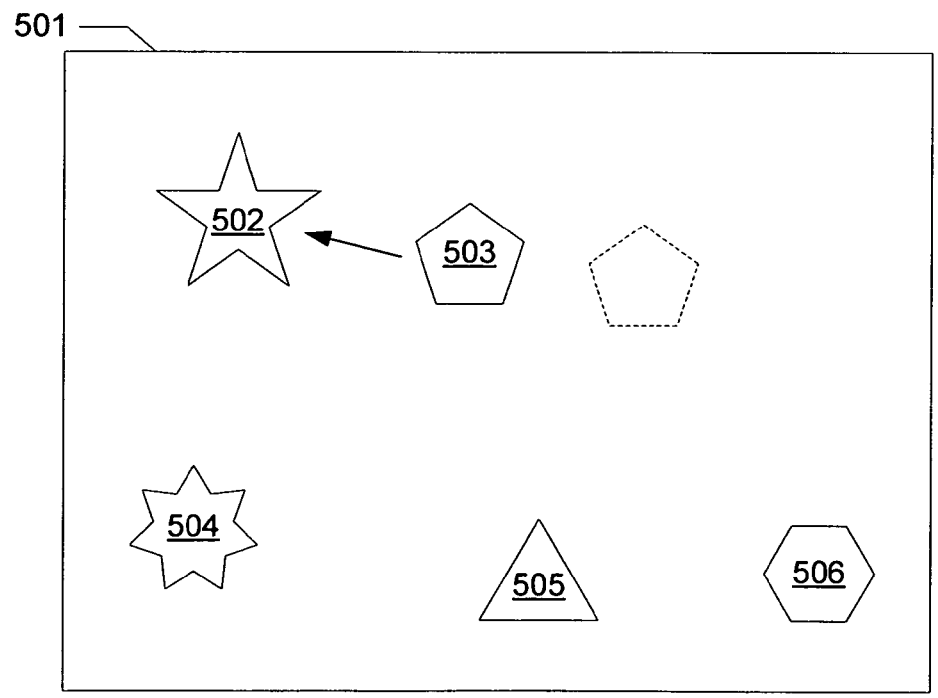

FIGS. 8a and 8b illustrate display sequences for an alternative rule. In this alternative, the released object may be anchored in its position (e.g., not moved under the rule), and the other selected object (or objects) may automatically move towards the released object. So as shown in FIG. 8a, objects 502 and 503 are once again selected, with object 502 being released. In response to the release of one object (object 502), the other selected object 503 may move towards the released object 502, as shown in FIG. 8b. In this example, the other objects 504-506 that were not selected are simply left in place and not moved. As an alternative, the direction of movement of the released may be opposite, and the other selected objects may automatically move away from the released object.

Figure 9A:
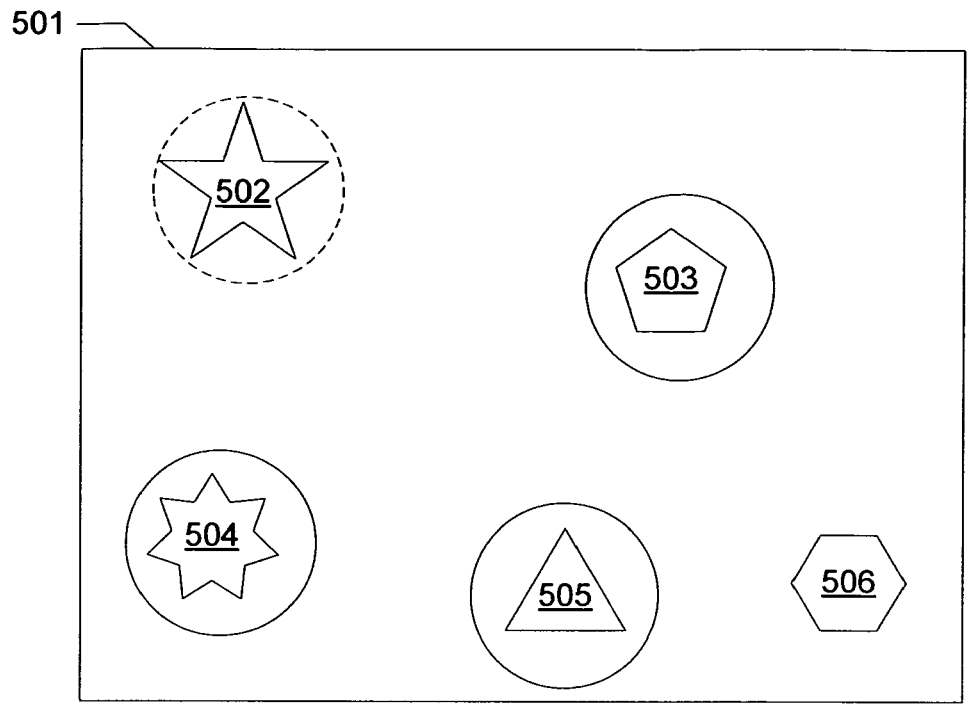
FIGS. 9a and 9b illustrate an example sequence of managed user inputs.
Figure 9B:
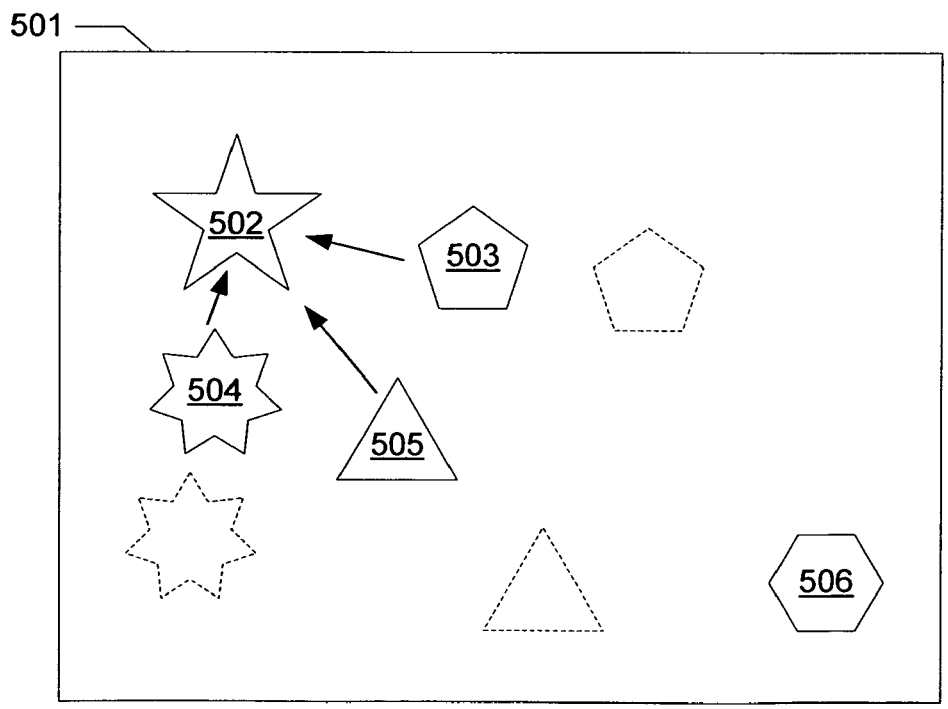

FIGS. 9a and 9b illustrate display sequences for another alternative rule that may be applied with the selection of multiple objects. In this example, objects 502-505 are selected (again, represented by the circles), and one object 502 is released. The movement of the other selected objects 503-505 may each be in a direction that is towards the released object 502, as illustrated in FIG. 9b. Again, as an alternative, the movement direction may be in the opposite direction, where the other selected objects move in a direction that is away from the released object 502.

Figure 10A:
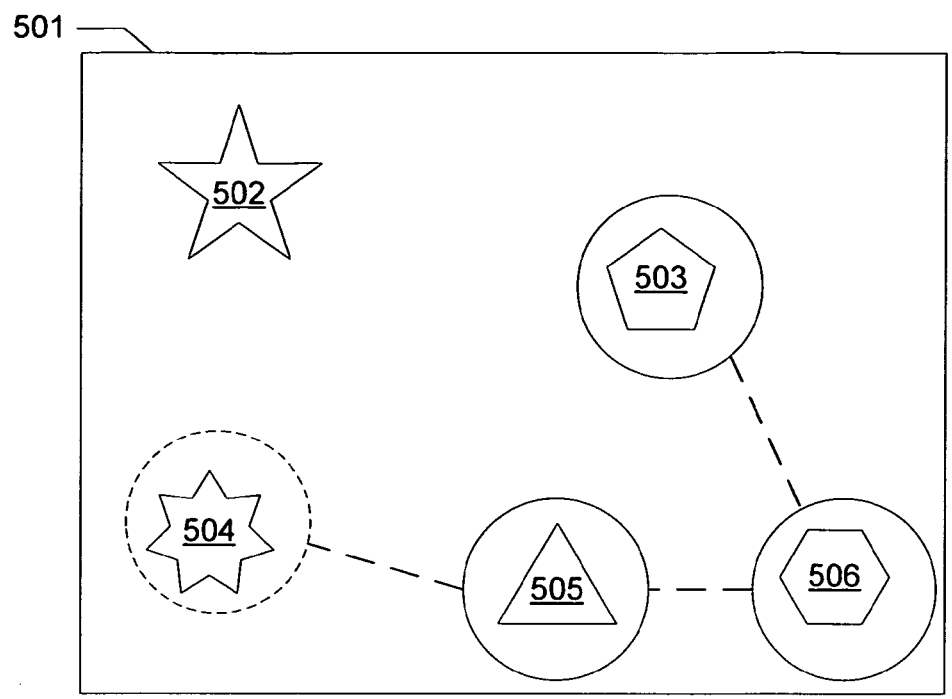
FIGS. 10a and 10b illustrate an example sequence of managed user inputs.
Figure 10B:
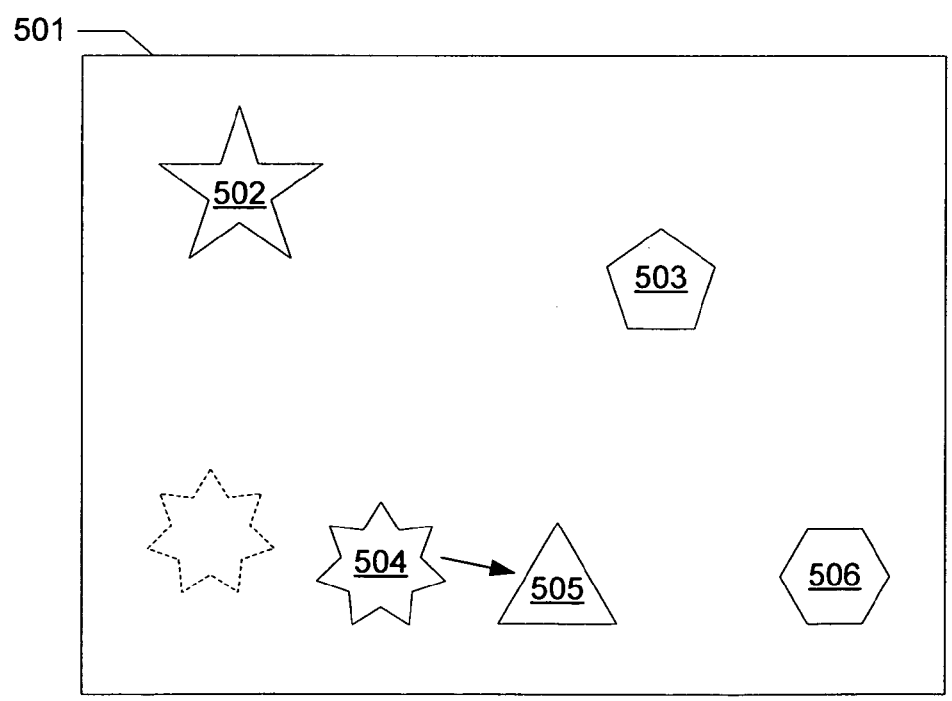

FIGS. 10a and 10b illustrate display sequences for another alternative rule that may be applied with the selection of multiple objects. In this example, objects 503-506 are selected, although the system may store information identifying a sequence in which the various objects are selected. For example, the objects 503-506 may have been selected in the following order: 503-506-505-504, as illustrated in FIG. 10a. Object 502 may be released by, for example, the user lifting a finger off of the object. Or, if a selection timer was implemented (e.g., a timer counting time since the last selection, or since selection began), the last selected object 504 may automatically be the released object upon expiration of the timer. Alternatively, the first selected object, or any other numbered selected object (e.g., the $2^{nd}$, $3^{rd}$, etc.), may be considered to be the released object.

As illustrated in FIG. 10b, the movement of the released object 504 may be in a direction that is towards the object 505 that was selected immediately prior to the selection of the released object 504. The information regarding the sequence of the selection may be retained, and may be used for further movement. For example, when released object 504 reaches the previously-selected object 505, it (or the previously-selected object 505) may then move in a direction towards the next earlier selected object (in the example, towards object 506). Alternatively, the direction of movement may be towards the first selected object, or any other numbered selected object. As a further alternative, the direction of movement may be in an opposite direction—moving away from the most recently selected object (or the $2^{nd}$, $3^{rd}$, etc. most recently selected object, or the very first selected object).

Figure 11A:
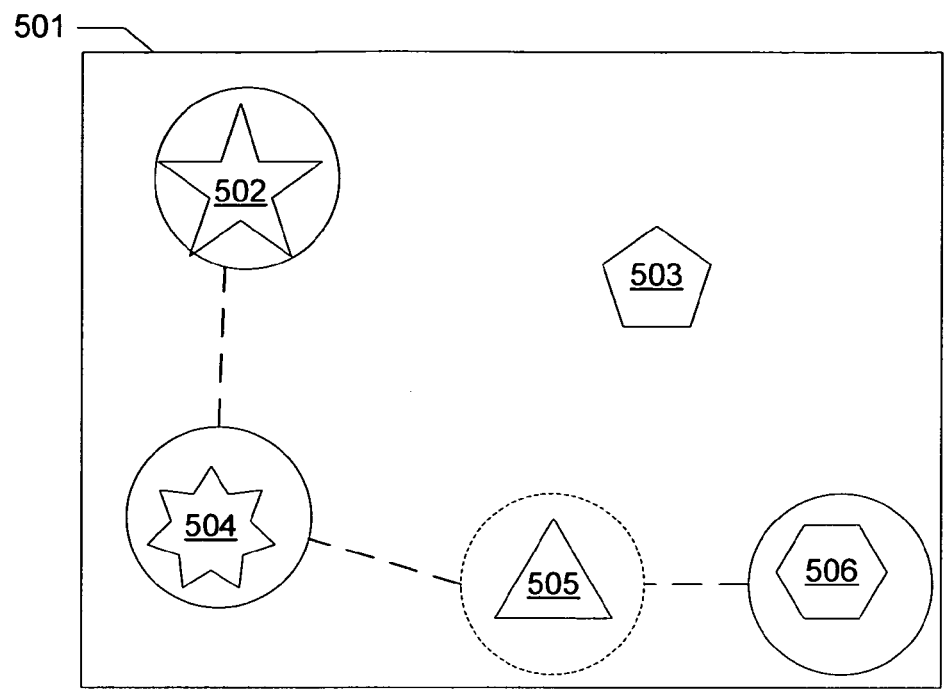
FIGS. 11a and 11b illustrate an example sequence of managed user inputs.
Figure 11B:
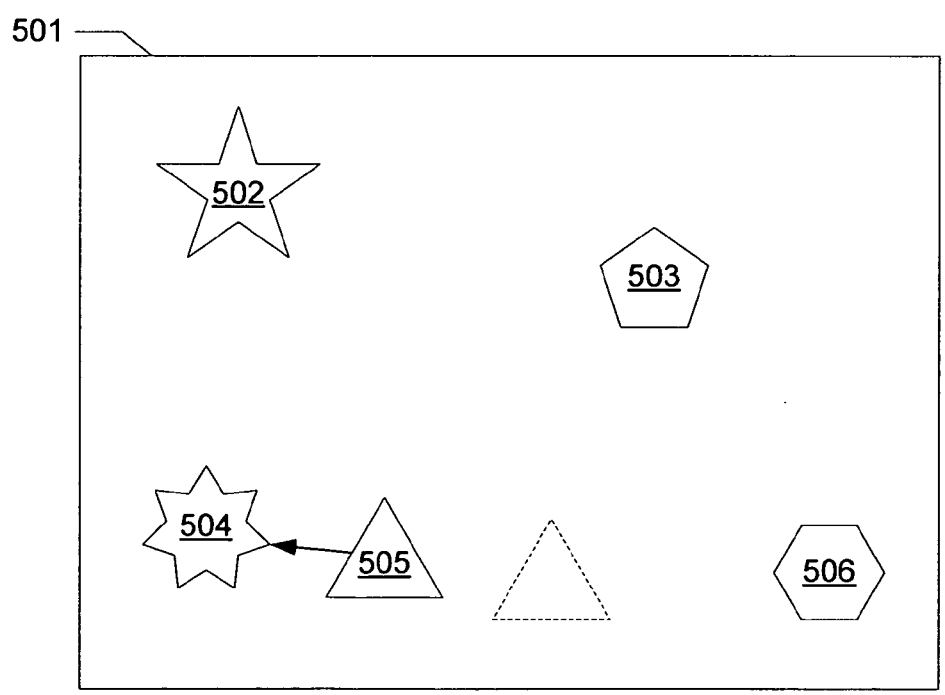

FIGS. 11a and 11b illustrate display sequences of another alternative rule. As shown in FIG. 11a, a group of objects 504-506 is selected, and the computer system may store in memory the order or sequence in which the objects were selected. Upon releasing an object 505 (e.g., by the user lifting a finger off of a selected object 505), the computer may compare the relative distances between the released object and the other selected objects, and may determine a direction of movement accordingly. For example, when a sequence of selected objects is available, the system may determine whether more selected objects appear earlier or later than the released object 505 in the sequence, or were selected before/after the released object 505, and the direction of movement may be in the direction from the short side to the long side, or vice versa. So, as shown in FIG. 11b, with object 505 released, there are more selected objects in the sequence (represented by the dashed line, which may resemble a chain) to the left of object 505 than to the right, so the resulting direction of movement may be from the short side (the side to the right, the side having fewer selected objects in the sequence) to the long side. As an alternative, the direction of movement may be opposite—from long side to short.

The various rules identified above describe how the identification of moving object, and the direction of movement, may be determined based on the selection and/or release of one or more objects. The determination of movement characteristics may also be based on gestures. For example, if a user releases an object by swiping a finger in a given direction on the display, the movement direction may be in the direction of (or alternatively, in the opposite direction of) the swipe. Multiple releases in this manner may cause multiple objects to move in the directions of the swipes, or towards (or away from) a midpoint pointed to by the swipes (if the swipes are towards one another).

Figure 12A:
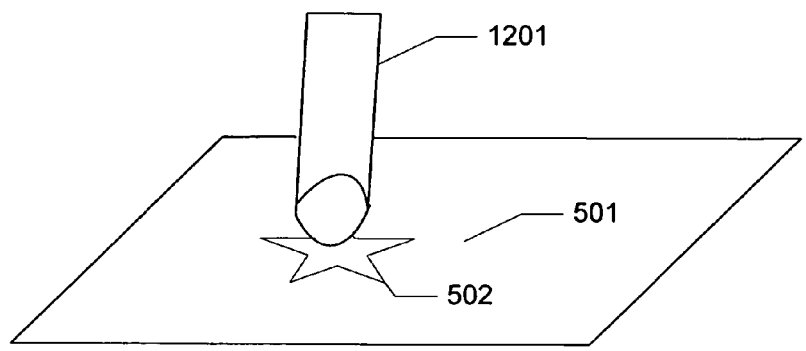
FIGS. 12a-b illustrate an example user input.
Figure 12B:
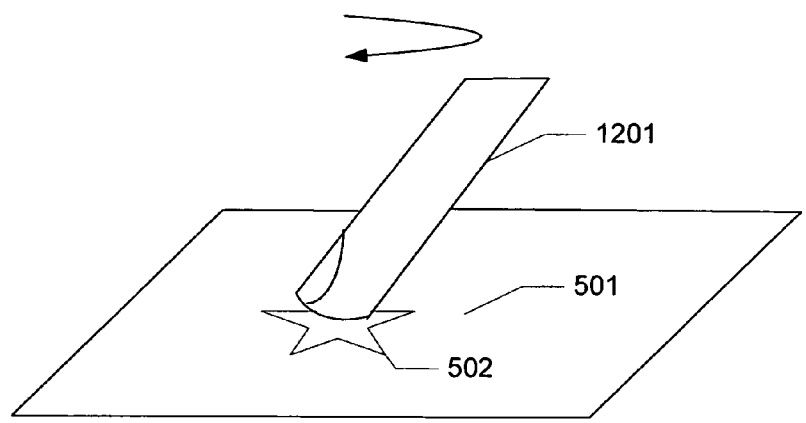

Other gestures may be used as well, such as moving a finger in a circular motion, a spiral motion, or any other gesture may be mapped to a predetermined movement characteristic, such as speed, and path (e.g., circular path, spiral path, etc.). Some gestures may incorporate the angle with which a stylus is held near or against the display, such that adjusting the angle may affect the movement. As another example of an angled input, a user may hold a tip of the stylus against the display screen, and rotate an upper end of the stylus in a circle. FIGS. 12a-b illustrate an example of such a circular gesture, where the user's finger 1201 rotates while the fingertip remains over the virtual object 502 displayed on the display 501.

In the various selections and releases described above, the user may inadvertently select an object that he/she did not mean to select. A number of approaches may be taken to allow a user to de-select a piece without "releasing" it to movement. One approach may allow a user to slowly slide his/her finger off of an object. To support this, the computer system may maintain a predefined threshold speed (e.g., 100 pixels per second) in memory, where movements of a finger below the speed are treated as a deselection, and movements above the speed may be treated as swipes, as described above. Accordingly, a user who has placed a finger on an unintended object may slowly slide his/her finger off of the object to deselect it. As another approach, the computer system may be configured to require gestures, such as a swipe in which the finger/stylus crosses a periphery of an object, to initiate movement. In such situations, the user may simply lift his/her finger off of an object without generating a swipe, to deselect the object.

As discussed earlier above, a user may select an object by placing a finger/stylus over the object, and then release the object to movement by lifting the finger off of the object. There may also be alternative approaches to defining a release. For example, in configurations where the user is not required to maintain a finger/stylus over an object to select it (e.g., if tapping an object is sufficient to select it, and a selection timer is used to identify when group selection ends), the release may be defined to occur as soon as the user re-selects a previously-selected object.

The various descriptions above refer to movement of virtual objects, and that movement may have a variety of characteristics, such as direction, speed, path, etc. The rules defining the movement of a virtual object may also define how those objects will interact with other objects. For example, virtual objects may be given additional characteristics (e.g., a mass, size, shape, texture, etc.), and when a moving virtual object collides with another object, the mass values of the two objects may help determine how the objects will behave after the collision. Some objects may be defined as being permeable, such that objects may pass through one another, and the permeability may affect the movement characteristics of the moving object (e.g., an object slows down when it passes through another object). Some objects may be defined as immobile, such as walls.

The various features described above can be used in any desired type of specific application. For example, the input mechanics can be used to provide entertainment software and video games, such as a billiards game, a rubber-band fight, or any other type of application in which displayed objects move and interact with one another.

Using one or more of the features and approaches described above, a user's experience with changing desktop orientations can be improved. Although the description above provides illustrative examples and sequences of actions, it should be understood that the various examples and sequences may be rearranged, divided, combined and sub-combined as desired. Accordingly, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim the following:

1. A method of interacting with a computing device, comprising the steps of:
   initiating a selection timer for user selection of at least one displayed object;
   displaying a plurality of graphical objects on a touch sensitive display;
   receiving a selection of a subset of the graphical objects by detecting a plurality of user inputs, wherein the user inputs each include positioning a physical control member over one of the objects on the display;
   maintaining a sequence in which selected objects are selected;
   detecting a selection release input regarding one of the currently selected objects; and
   in response to the selection release input, moving one of the currently selected objects in a direction based on a positional relationship between the released object and one or more others of the selected objects, wherein the selection release input is an automatic identification of one of the currently selected objects upon expiration of the time based on the sequence.

2. The method of claim 1, wherein the positioning of the physical control member includes receiving a touch indication on the display.

3. The method of claim 1, wherein the positioning of the physical control member includes receiving a touch indication for a predetermined period of time.

4. The method of claim 1, wherein the automatic identification identifies a first selected object in the sequence.

5. A computer-implemented method for interacting with a computing device, the method comprising:
   displaying a plurality of graphical objects on a touch sensitive display;
   receiving a selection of a subset of the graphical objects by detecting a plurality of user inputs, wherein the user inputs each include positioning a physical control member over one of the objects on said display;
   detecting a selection release input regarding one of the currently selected objects; and
   in response to the selection release input, moving one of the currently selected objects in a direction based on a positional relationship between the released object and one or more others of the selected objects, wherein the selection release input includes a received gesture via the physical control member, wherein a movement characteristic is applied based on the gesture, wherein the movement characteristic defines a non-linear path of the moving object in the direction.

6. The computer-implemented method of claim 5, wherein the movement characteristic adjusts a speed with which the object is moved in the direction.

7. The computer-implemented method of claim 5, wherein the positioning of the physical control member includes receiving a touch indication on the display.

8. The computer-implemented method of claim 5, wherein the positioning of the physical control member includes receiving a touch indication for a predetermined period of time.

9. The computer-implemented method of claim 5, wherein the released object is moved in the step of moving.

10. The computer-implemented method of claim 9, wherein the direction is toward one or more other selected objects.

11. The computer-implemented method of claim 10, further comprising maintaining a sequence in which the objects are selected, wherein the direction is based on the sequence.

12. A system for interacting with a computing device, the system comprising:
   a processor; and
   a memory having computer executable instructions stored thereon, wherein the computer executable instructions are configured for:
      displaying a plurality of graphical objects on a touch sensitive display;
      receiving a selection of a subset of the graphical objects by detecting a plurality of user inputs, wherein the user inputs each include positioning a physical control member over one of the objects on the display;

maintaining a sequence in which the objects are selected;

detecting a selection release input regarding one of the currently selected objects; and in response to the selection release input, moving the released object in a direction toward the one or more others of the currently selected objects, wherein the direction is based on the sequence.

13. The system of claim 12, wherein the released object is neither a first nor a last in the sequence, wherein the direction is based on a comparison of a number of selected objects indicated before the released object in the sequence with a number of selected objects.

14. The system of claim 12, wherein the positioning of the physical control member includes receiving a touch indication on the display.

15. The system of claim 12, wherein the positioning of the physical control member includes receiving a touch indication for a predetermined period of time.

16. The system of claim 12, wherein the selection release input includes a cease indication that identifies that the physical control member ceases to be positioned over one of the objects on the display.

17. A computer-readable storage medium having computer executable instructions for interacting with a computing device, the instructions comprising:

displaying a plurality of graphical objects on a touch sensitive display;

receiving a selection of a subset of the graphical objects by detecting a plurality of user inputs, wherein the user inputs each include positioning a physical control member over one of the objects on the display;

identifying a sequence in which the selected objects are selected;

detecting a selection release input regarding one of the currently selected objects; and in response to the selection release input, moving one of the currently selected objects in a direction based on a positional relationship between the released object and one or more others of the currently selected objects, wherein the direction is further based on the sequence.

18. The computer-readable storage medium of claim 17, wherein the positioning of the physical control member includes receiving a touch indication on the display.

19. The computer-readable storage medium of claim 17, wherein the positioning of the physical control member includes receiving a touch indication for a predetermined period of time.

20. The computer-readable storage medium of claim 17, wherein the selection release input includes a cease indication that identifies that the physical control member ceases to be positioned over one of the objects on the display.

* * * * *